United States Patent [19]
Vallance

[11] 3,719,226
[45] March 6, 1973

[54] SEAL ASSEMBLY FOR A GAS TURBINE REGENERATOR

[75] Inventor: James K. Vallance, Dearborn Heights, Mich.

[73] Assignee: Ford Motor Company, Dearborn, Mich.

[22] Filed: Aug. 2, 1971

[21] Appl. No.: 168,229

[52] U.S. Cl.......................165/9, 277/81 R, 277/96
[51] Int. Cl............................................F28d 19/04
[58] Field of Search..................165/9; 277/81 R, 96

[56] References Cited

UNITED STATES PATENTS

| | | | |
|---|---|---|---|
| 3,311,162 | 3/1967 | Chapman et al. | 165/9 |
| 3,542,122 | 11/1970 | Bracken, Jr. | 165/9 |
| 3,559,725 | 2/1971 | Fucinari et al. | 165/9 X |

*Primary Examiner*—Albert W. Davis, Jr.
*Attorney*—Keith L. Zerschling et al.

[57] ABSTRACT

A secondary foil is attached to the end portions of C-shaped rubbing seals so that the foil spans the end portion of a crossarm seal. The secondary foil is concave and has a smaller radius of curvature than the C-shaped seals. Thermal expansion of the crossarm seal changes the contact line between an end foil attached to the end portion of the crossarm seal and the concave surface of the secondary foil and thereby maintains gas sealing without developing undue stresses.

13 Claims, 8 Drawing Figures

INVENTOR
JAMES K. VALLANCE
BY
John R. Faulkner
Glenn I. Arendsen
ATTORNEYS

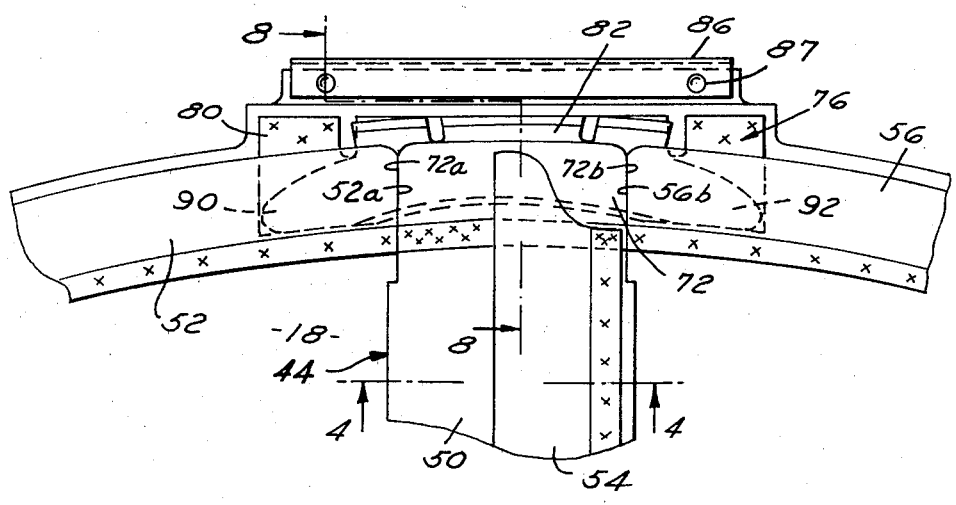
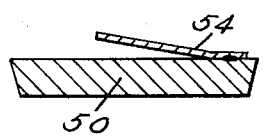
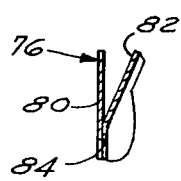
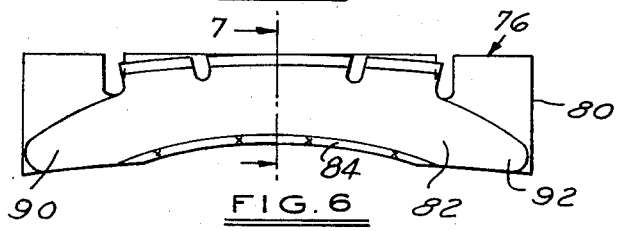
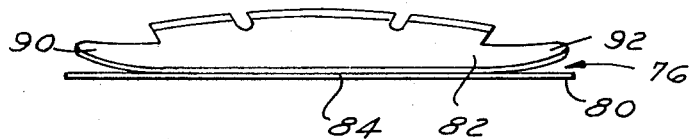
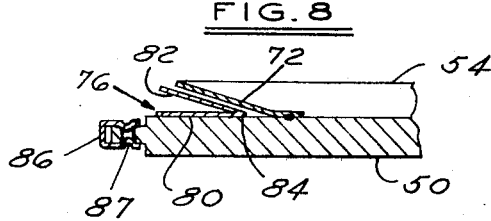

SEAL ASSEMBLY FOR A GAS TURBINE REGENERATOR

SUMMARY OF THE INVENTION

Rotary regenerators for gas turbine engines are being made of ceramic materials capable of effective operation at relatively high temperatures. Thermal expansion characteristics of such ceramic regenerators differ considerably from the engine housing and rubbing seal assemblies having one surface rubbing on the ceramic regenerator and a flexible metal foil on the other surface that is maintained in contact with the engine housing by gas pressure differentials have been used to absorb such expansion differences.

In a typical gas turbine engine having a disc-shaped regenerator, hot exhaust gases pass through one sector of the regenerator and regenerator rotation transfers heat therefrom to inducted air passing through another sector. The inducted air also surrounds the periphery of the regenerator to cool a rim type driving system for the regenerator. Sealing is necessary around the entire periphery of one face of the regenerator and also across that face to separate the sectors from each other. A crossarm seal extending between the sectors operates at a much higher temperature than either of the peripheral seals and its longitudinal thermal expansion has been absorbed by separating the crossarm seal from the peripheral seals and permitting relative movement between the end portions of the crossarm seal and the peripheral seals. Considerable difficulties have been encountered in maintaining effective seals at the end portions since crossarm seal expansion tends to move end foils attached to the crossarm seal out of alignment with the foils of the peripheral seals. Moreover, sealing must be maintained not only from one sector to the other but also from the peripheral exterior of the regenerator to each sector.

This invention provides a sealing system for a regenerator that maintains excellent sealing despite considerable differences in thermally induced dimensional changes between a crossarm seal assembly and a peripheral seal assembly. In a gas turbine engine having a regenerator rotating in a housing with sectors of the regenerator being subjected to gas streams of different pressures, the sealing system of this invention comprises a peripheral seal assembly extending around one of the sectors of the regenerator adjacent the regenerator rim and a crossarm seal assembly extending across the regenerator. End portions of the crossarm seal assembly are adjacent the ends of the peripheral seal assembly and each of the seal assemblies includes a shoe having a foil attached to a surface thereof so the foil projects toward a portion of the engine housing.

A relatively short end foil is attached to each end of the crossarm seal assembly in substantial alignment with the adjacent end of the foil attached to the peripheral seal assembly. A secondary foil is attached to each end portion of the peripheral seal assembly and extends behind the end foil of the crossarm seal assembly. Each secondary foil has a concave shape. The edges of the end foils initially contact the secondary foils to form a sealing line that is closely adjacent the end of the foil of the peripheral seal assembly. Thermal expansion of the crossarm seal assembly moves the end foil thereof into the concave surface of the secondary foil and thereby moves the sealing line inward along the concave surface of the secondary foil without diminishing the sealing effectiveness of the sealing line.

A second peripheral seal assembly can be located around the other sector of the regenerator so its ends are spaced away from the ends of the first peripheral seal assembly by the width of the crossarm end portion. The secondary foil is attached to the shoes of both peripheral assemblies so that the secondary foil spans the end portion of the crossarm seal assembly behind its end foil.

Line contact between the secondary foil and the ends of the foils of the peripheral seals can be provided to prevent significant leakage from the periphery to the sectors. Small tabs can be included on the ends of the secondary foil to bear against the ends of the foils of the peripheral seal assemblies to preload the peripheral foils during engine starting. During engine operation, pressure differentials typically ranging up to about 4 atmospheres in automotive type turbine engines maintain the foils in proper sealing contact with the engine housing. The seals can be used with higher pressure differentials if desired.

BRIEF DESCRIPTION OF THE DRAWINGS

FIG. 3 is an enlarged plan view of the ends of the peripheral and crossarm seals that shows the end foil of the crossarm seal and the relationship of the secondary foil to the other foils.

FIG. 4 is a sectional view taken along line 4—4 of FIG. 3 to show the cross sectional shape of the crossarm seal.

FIGS. 5 and 6 are top and side views of the secondary foil.

FIG. 7 is a cross section of the secondary foil taken along line 7—7 of FIG. 5.

FIG. 8 is a sectional view taken along line 8—8 of FIG. 3 to show the relationship between the secondary foil and the end foil of the crossarm seal.

DETAILED DESCRIPTION

Figure 1:
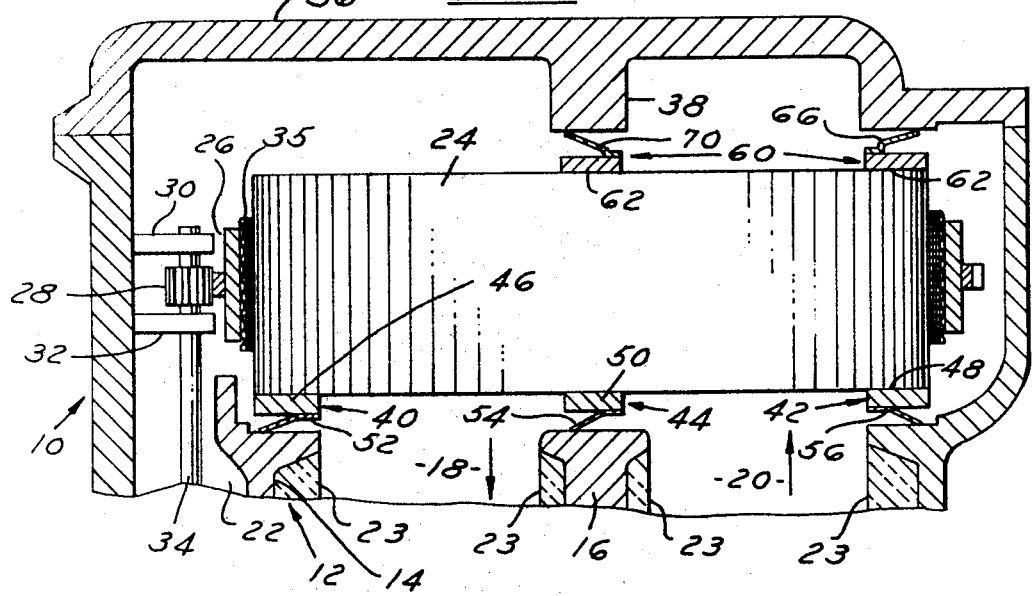
FIG. 1 is a sectional view through the regenerator portion of a gas turbine engine showing the relationship of a disc-shaped rotating regenerator to the engine housing.
Figure 2:
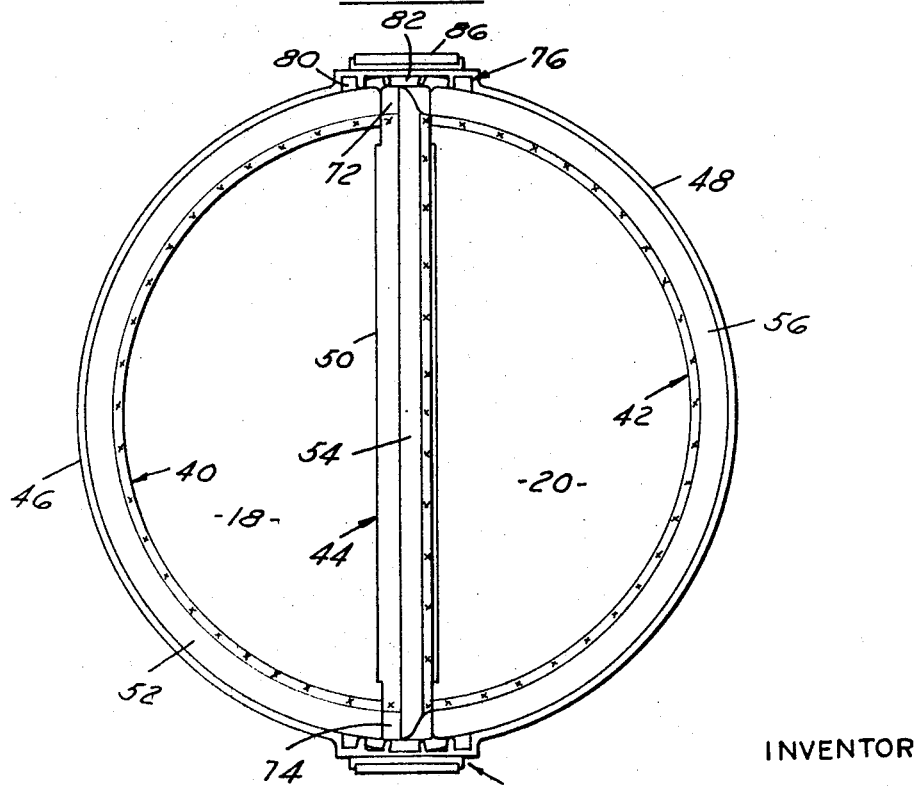
FIG. 2 is a plan view of the peripheral seals and a crossarm seal that make up the sealing system between the lower or inner regenerator surface and the adjacent portion of the regenerator housing.

Referring primarily to FIGS. 1 and 2, a gas turbine engine containing the sealing system of this invention has an elliptically shaped metal outer housing 10 that is open at the top of the regenerator portion (FIG. 1 is sectioned along the major diameter of the ellipse). A smaller inner housing 12 is located inside housing 10 and terminates a short distance from the opening thereof. Inner housing 12, which can be integral with the outer housing, comprises an outer cylindrical wall 14 divided diametrically by a wall 16 into two semicircular passages 18 and 20. Wall 14 forms an annular passage 22 between a part of its circumference and housing 10. The inner sides of wall 14 and both sides of wall 16 are covered with appropriate insulation 23.

A disc-shaped regenerator 24 is mounted rotatably above inner housing 12. An annular ring gear 26 surrounds the regenerator 24 and meshes with a pinion gear 28 that is supported on the inner surface of housing 10 by projecting bosses 30 and 32. Pinion gear 28 is driven by the gas turbine engine through a shaft 34 located in annular passage 22 and the pinion gear in turn drives regenerator 24 through ring gear 26 and an appropriate torque transmitting member 35. A metal cover 36 is attached to outer housing 10 by conventional means (not shown) and covers the open portion of the outer housing. Cover 36 has a downwardly projecting ridge 38 that is aligned with diametrical wall 16.

An inner sealing system consisting of two C-shaped peripheral seal assemblies 40 and 42 and an inner crossarm seal assembly 44 seals appropriate junctions between the inner surface of regenerator 24 and the inner housing 12. Each of seal assemblies 40, 42 and 44 includes a respective shoe 46, 48 and 50 having one surface sliding against the regenerator. Opposite surfaces of each shoe have one edge of a respective foil 52, 54 and 56 attached thereto. The outer edge of each foil projects toward an appropriate surface of inner housing 12.

A D-shaped outer seal assembly 60 seals appropriate junctions between the outer surface of regenerator 24 and cover 36. Outer seal assembly 60 comprises a shoe 62 having a peripheral portion extending around the right sector of regenerator 24 and a crossarm portion extending across the regenerator below ridge 38. One surface of shoe 62 slides against the outer surface of regenerator 24. One edge of a projecting foil 66 is attached to the inner portion of the outer surface of the peripheral portion and its projecting edge extends upward and onward to contact cover 36. One edge of a projecting foil 70 is attached to the right side of the outer surface of the crossarm portion of shoe 62 and its other edge projects upward and outward to contact ridge 38.

Referring primarily to FIGS. 2-8, each end of crossarm seal assembly 44 has an end foil 72, 74 attached thereto. The radially inner edge of each end foil 72, 74 is welded to shoe 50 and each radially outer edge thereof projects upward so the lateral edges 72a, 72b are adjacent to and in substantially the same plane as the ends 52a and 56b of the peripheral foils 52 and 56 (FIG. 3). Foil 54, the longitudinal foil of seal assembly 44, has its ends contoured to follow closely the interior surfaces of end foils 72 and 74.

A secondary foil 76, 78 is positioned radially outward of each respective end foil 72, 74 and the ends of the respective peripheral foils. Each secondary foil comprises a flat base portion 80 that is subtended by a reversely projecting portion 82. Projecting portion 82 is attached to portion 80 at its radially inner edge 84 and edge 84 has a concave shape with a radius of curvature less than that of the peripheral seal assemblies. In a typical automotive engine having peripheral seal assemblies with a diameter of about 28 inches, the radius of curvature of edge 84 of the secondary foil is about 8 inches. The secondary foils, like the other foils in the seal assembly, typically are made of stainless steel, nickel alloys, or other materials having suitable temperature and strength characteristics.

Each secondary foil has its base portion 80 welded to the ends of peripheral shoes 46 and 48 behind peripheral foils 52 and 56 (see especially FIG. 3). The central portions of the secondary foils thus span the end portions of the crossarm shoe 50.

A retainer strap 86 is attached to the end portions of the peripheral shoes radially outward of the end foil to maintain the shoes in proper position. Strap 86 spans the end portion of the crossarm shoe but is not attached rigidly thereto. Strap 86 can be fastened to the peripheral shoes by threaded fasteners, welds, etc. One very convenient and inexpensive technique involves pressing dimples 87 into corresponding holes in the C shoes to produce a staked construction; this technique provides adequate retention while permitting some relative movement.

During engine operation, relatively cool air from the engine compressor (not shown) flows up passage 22 and is turned downward by the front portion of cover 36 into the porous front sector of rotating regenerator 24. The air passing through the front sector of regenerator 24 flows downward in passage 18 to the engine combustion chamber (not shown). Hot combustion gases from the combustion chamber pass initially through the turbine wheels (not shown) and then flow upward through passage 20, the right sector of regenerator 24 and into the space surrounded by the outer seal assembly from which the gases eventually are dissipated into the atmosphere.

The air in passage 22 extends around the entire periphery of regenerator 24 and usually is at a pressure of at least about 4 atmospheres. Exhaust gases in passage 20 typically are just slightly above atmospheric pressure but are at a high temperature, usually about 1,300°F. Heat transferred from the exhaust gases to the air passing through the left sector of regenerator 24 raises the temperature of the air flowing in passage 18 to a temperature exceeding about 1,000°F.

When all of the seal components are at low temperatures, the lateral edges of foils 52, 56, 72 and 74 (i.e., edges 52a, 56b, 72a and 72b) have sealing line contact with projecting portions of the secondary foils. Gas pressure differentials existing across each peripheral seal assembly and the crossarm seal assembly during engine operation enhance the line contact to ensure good sealing.

During engine operation, the crossarm seal assembly reaches temperatures considerably higher than the peripheral seal assemblies. The crossarm assembly is free to grow longitudinally as a result of the thermal expansion, and as it does so, the line contacts originally at the longitudinal edges of its end foils (i.e., edges 72a, 72b) move inward along the projecting portion 82 of the secondary foil. Thus line contact is maintained throughout engine operation and the line contact prevents significant gas leakage between sectors and from the periphery to either sector.

Small tabs 90, 92 can be included on the lateral ends of projecting portion 82 of the secondary foil to bear against the ends of the peripheral foils. The tabs preload those ends during starting and low pressure operation. Edge 84 of each secondary foil has a radius of curvature dependent primarily on the relative expansion characteristics of the seal assemblies; its curvature can be optimized for each engine design by a series of simple empirical tests. Each secondary foil preferably is designed to leave small spaces between its inner edge and the end foil of the crossarm at low temperatures as shown in FIG. 3. The spaces permit some leakage during engine starting, but the amount of leakage is insignificant and the resulting stress reduction at high temperatures prolongs seal life considerably.

Thus the invention provides a sealing system for a rotating regenerator of a gas turbine engine that permits thermal expansion of the crossarm seal assembly without diminishing the sealing ability and without generating undue stresses. The sealing system prevents significant leakage between sectors of the regenerator surface as well as between each sector and the regenerator periphery.

I claim:

1. In a gas turbine engine having a regenerator rotating in a housing with sectors of said regenerator being subjected to gas streams of different pressures, a sealing system for said regenerator comprising a peripheral seal assembly extending around one of said sectors adjacent the rim of the regenerator and a crossarm seal assembly extending across the regenerator, the end portions of the crossarm seal assembly being adjacent the ends of the peripheral seal assembly, each of said seal assemblies including a shoe having a foil attached to a surface so the foil projects toward a portion of the housing, an end foil attached to each end of the crossarm seal assembly in substantial alignment with an end of the foil attached to the peripheral seal assembly, and, a secondary foil attached to each end portion of said peripheral seal assembly, each secondary foil being located behind the respective end foil of the crossarm seal assembly, each secondary foil having a concave shape behind its respective end foil and each secondary foil contacting sealingly its respective end foil at a location spaced along said concave shape depending on the relative thermal expansion of the crossarm assembly.

2. The engine of claim 1 comprising a second peripheral seal assembly extending around another of said sectors of the regenerator adjacent the rim of the regenerator, said second peripheral seal assembly including a shoe having a foil attached to a surface, the ends of said second peripheral seal assembly being separated from the ends of the first peripheral seal assembly by the end portions of the crossarm seal assembly, each of said secondary foils being attached to the appropriate ends of the first and second peripheral seal assemblies, said crossarm seal assembly being free to expand longitudinally relative to said peripheral seal assemblies.

3. The engine of claim 2 in which the regenerator is disc shaped and the exteriors of said peripheral seal assemblies are subjected during engine operation to a gas stream having a pressure higher than the pressures at the interiors of the peripheral seal assemblies.

4. The engine of claim 3 in which each secondary foil also contacts sealingly the respective ends of the foils of the peripheral seal assemblies.

5. The engine of claim 4 in which the radially inner edge of each secondary foil has a radius of curvature less than the radius of curvature of the peripheral seal assemblies.

6. The engine of claim 5 comprising a tab on each lateral end of each secondary foil, said tabs bearing against the respective end portions of the foils of the peripheral seal assemblies.

7. The engine of claim 6 comprising retainer straps staked to the end portions of the shoes of the peripheral shoe assemblies, each of said retainer straps spanning the respective end portion of the crossarm seal assembly.

8. The engine of claim 1 in which the regenerator is disc shaped and the exterior of the peripheral seal assembly is subjected during engine operation to a gas stream having a pressure higher than the pressure at the interior of the peripheral seal assembly.

9. The engine of claim 1 in which each secondary foil also contacts sealingly the respective end of the foil of the peripheral seal assembly.

10. The engine of claim 1 in which the radially inner edge of each secondary foil has a radius of curvature less than the radius of curvature of the peripheral seal assembly.

11. In a gas turbine engine having a regenerator rotating in a housing with sectors of said regenerator being subjected to gas streams of different pressures and the exterior of said regenerator being subjected to a gas pressure greater than the pressure in either sector, a sealing means for said regenerator comprising a peripheral shoe surrounding a portion of at least one of said sectors, said peripheral shoe having one surface sliding on said regenerator and the other surface adjacent a wall of said housing, a crossarm shoe dividing said sectors and having its end portions adjacent the end portions of said peripheral shoe so the peripheral shoe and the crossarm shoe surround completely one of said sectors, said cross-arm shoe having one surface sliding on said regenerator and the other surface adjacent a wall of said housing, a foil attached to said peripheral shoe and projecting outward and toward the adjacent wall of the housing, said foil being maintained in sealing contact with the adjacent wall by the gas pressure differential between the exterior of the regenerator and the sector, a foil attached to and extending longitudinally along said crossarm seal, said foil projecting toward an adjacent wall of the housing, said foil being maintained in sealing contact with the adjacent wall by a gas pressure differential, end foils attached to the end portions of the crossarm shoe, said end foils extending laterally across the end portions of the crossarm shoe in substantial alignment with the ends of the foil attached to the peripheral shoe, and a secondary foil positioned outside of each end foil, each of said secondary foils maintaining sealing contact with its end foil despite thermally induced movement of the crossarm shoe relative to the peripheral shoe.

12. The engine of claim 11 comprising a second peripheral shoe surrounding another of said sectors and retainer straps having portions depressed into corresponding openings of the peripheral shoes to attach the peripheral shoes to each other, said retainer straps spanning the end portions of the crossarm shoe.

13. The engine of claim 12 in which at least part of the radially inner edge of each secondary foil is concave and has a radius of curvature less than that of the peripheral shoes.

* * * * *